Aug. 13, 1940.   R. GUNN   2,210,932
APPARATUS AND METHOD FOR FACILITATING THE NAVIGATION OF AIRCRAFT
Filed Feb. 24, 1937
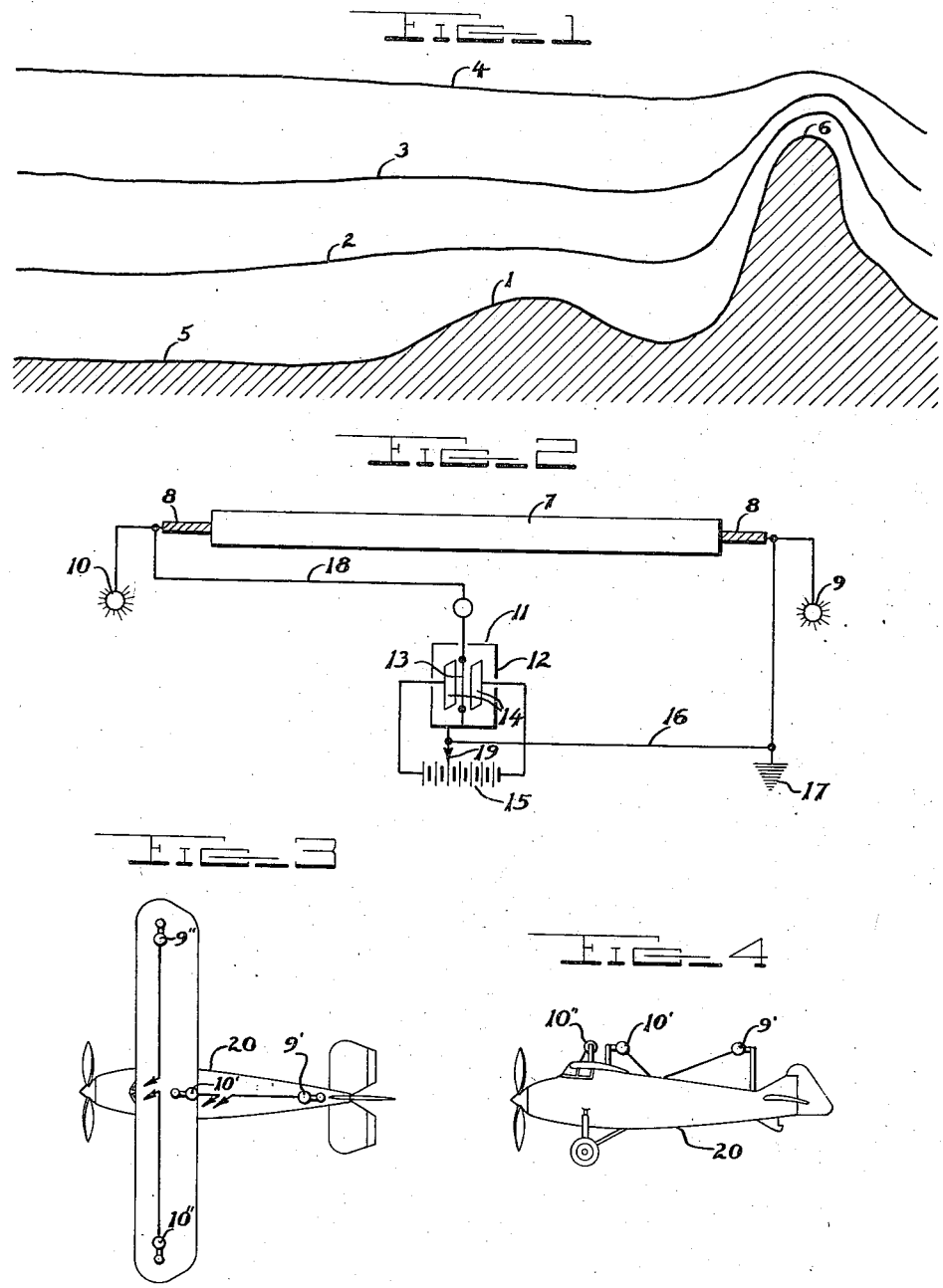
INVENTOR
Ross Gunn
BY
ATTORNEY Patented Aug. 13, 1940

2,210,932

UNITED STATES PATENT OFFICE 2,210,932

APPARATUS AND METHOD FOR FACILITATING THE NAVIGATION OF AIRCRAFT

Ross Gunn, Washington, D. C.

Application February 24, 1937, Serial No. 127,505

7 Claims. (Cl. 177—352)

(Granted under the act of March 3, 1883, as amended April 30, 1928; 370 O. G. 757)

My invention relates to an apparatus and method for facilitating the navigation of aircraft and more particularly to such an apparatus and method which under conditions of poor visibility will enble the pilot to maintain a condition of horizontal flight over substantially level country or alternatively will enable him to detect the presence of mountains or rapid changes in the configuration of the terrain below.

In carrying out my invention I equip an aircraft of either the lighter-than-air or heavier-than-air type with apparatus by means of which the pilot may navigate the craft substantially along an equi-potential surface in the earth's atmosphere. This apparatus comprises broadly a plurality of bodies which are insulatingly mounted on the aircraft and so arranged that in a predetermined attitude of flight of the said craft they will lie substantially along an equipotential surface. Means is associated with the aforesaid bodies for detecting any departure of the same from a selected equipotential surface. The apparatus in addition to enabling the pilot to navigate the aircraft substantially along an equipotential surface, serves also under certain circumstances as an inclinometer as will be explained more in detail hereinafter.

With the foregoing in view it is an object of my invention to provide an apparatus and method for navigating aircraft which under conditions of low visibility will enable the pilot to maintain a condition of horizontal flight over substantially level country; to detect the presence of mountains and thereby avoid the same; and to detect other rapid changes in the configuration of the earth's surface.

It is another object of my invention to provide in combination with an aircraft means for advising the pilot of any departure of said craft from an equipotential surface.

It is another and further object of my invention to provide a new and novel method for navigating an aircraft which includes the step of guiding the same substantially along an equipotential surface.

Other objects and many of the attendant advantages of this invention will be readily appreciated as the same becomes better understood by reference to the following detailed description when considered in connection with the accompanying single sheet of drawings, wherein:

Fig. 1 is a view in vertical section of a plain and mountainous region of the earth's surface and certain accompanying equipotential surfaces in the earth's atmosphere;

Fig. 2 is a diagrammatic view of one embodiment of an apparatus for determining the position of an equipotential surface; and Figs. 3 and 4 show the manner of mounting two units of the type depicted in Fig. 2 on an aircraft which here for illustrative purposes is depicted as an airplane.

It is well known that the earth's surface normally carries a negative electrical charge and that an electrical current constantly flows toward the earth. This current sets up a potential difference of such a magnitude that near the surface of the earth two points separated vertically by about a meter are at a difference of potential of approximately 150 volts. This systematic electrical current to the earth is surprisingly uniform and the equipotential surfaces are quite near to being parallel to the earth's surface. Now, if three or more bodies are suitably mounted on an aircraft and are arranged to lie substantially along an equipotential surface in a predetermined attitude of said craft, the said craft may be flown along an equipotential surface and hence substantially parallel to the earth's surface by providing an apparatus or instrumentality for indicating any departure of the aforesaid bodies from the selected equipotential surface.

The foregoing may be better understood by referring to Fig. 1 of the drawing which depicts in vertical section a plain and mountainous region of the earth's surface with certain accompanying equipotential surfaces in the earth's atmosphere. In this figure the full line 1 represents the surface of the earth; and the reference characters 2, 3 and 4 denote equipotential surfaces in the earth's ambient atmosphere which are respectively at a potential of 1,000, 2,000 and 3,000 volts with respect to the earth. These equipotential surfaces appear as lines in the drawing since the surfaces intersect the vertical plane on which the section of Fig. 1 is taken. It will be observed that these equipotential surfaces are substantially parallel to and substantially follow the configuration of the earth's surface; and that over a level portion or plain region 5 of the earth's surface the equipotential surfaces are substantially horizontal, while over a mountainous region 6 they are tilted and compressed. Since the position of an equipotential surface can be indicated on an aircraft, the craft may be flown along an equipotential surface and any departure therefrom noted. Thus, it is possible for the pilot under conditions of low visibility to maintain a condition of horizontal flight over substantially level country; to detect the presence of mountains and thereby avoid the same; and to detect other rapid changes in the configuration of the earth's surface.

In Fig. 2 of the drawing, there is shown one form of apparatus that may be employed for determining the position of an equipotential surface. In this figure the reference character 7 denotes a portion of the structure of an aircraft on which there are suitably mounted the first class insulators 8, 8 which may for example be fabricated from quartz, and supporting the bodies 9 and 10 in the manner shown. These bodies assume the potential of points in the atmosphere at which they are situated and for this purpose may be of any convenient design known to the prior art. In order to increase the sensitivity of the apparatus, however, I have shown each of the bodies 9 and 10 provided with a radioactive coating such as uranium, radium, ionium, radio lead-acetate or other radioactive material. Such a coating facilitates the maintenance of the body at the circumambient potential in that it causes increased ionization of the atmosphere adjacent the body and thus enables the body to quickly acquire a charge from or lose a charge to the surrounding region.

For measuring any difference in electrostatic potential and/or the sign or the direction of the potential gradient between the two bodies 9 and 10, I employ any suitable electrometer known to the prior art. Thus, any of the various instrumentalities for measuring differences of electrostatic potential and/or the direction of the potential gradient disclosed in my Patent 1,919,215 granted July 25, 1933, may be advantageously utilized. For illustrative purposes, however, I have shown in Fig. 2 of the drawing a string electrometer identified in general by the reference character 11 for measuring the magnitude of any difference in electrostatic potential and/or the sign thereof. This electrometer comprises a container 12 within which there is mounted and insulated therefrom a string 13 of any suitable design. Two plates or electrodes 14 are likewise positioned within the container 12 and insulated therefrom, the plates being maintained at different potentials by means of any suitable source of electromotive force 15. The container 12 is connected by means of the conductor 16 to the body 9 a point of the conductor, if desired, being grounded to any convenient portion of the aircraft at 17. For connecting the string 13 of the electrometer to the body 10 there is employed a conductor 18. An adjustable contact 19 is provided as shown so that any potential intermediate the terminals of the source of electromotive force 15 may be impressed on the container 12.

Before using the apparatus an initial adjustment is made. With the bodies 9 and 10 at the same potential the contact 19 is adjusted until the string 13 is not substantially deflected from the vertical. Now if the body 10 is at a higher potential than the body 9 the string 13 of the electrometer will undergo a lateral deflection, the magnitude of which is proportional to the difference in electrostatic potential between the bodies 9 and 10 and the direction of which will indicate the direction of the potential gradient between the bodies. Conversely, if the potential of the body 10 is lower than that of the body 9 the lateral deflection of the string 13 will be in an opposite direction to thus indicate a reversal in the direction of the potential gradient; and the magnitude of this deflection, like in the preceding case, will be proportional to the difference in electrostatic potential.

In Figs. 3 and 4 there are shown two units of the type depicted in Fig. 2 mounted on an aircraft which here for illustrative purposes has been shown as an airplane. It is to be emphasized at this point, however, that my invention is applicable to any aircraft whether it be of the lighter-than-air or heavier-than-air type. The bodies 9', 10', 9'', and 10'' are insulatingly mounted on the aircraft 20 in accordance with the teachings of Fig. 2; the first pair of bodies 9', 10' being positioned longitudinally of the craft and the second pair 9'', 10'' transversely thereof as shown. Furthermore, the bodies 9', 10', 9'', 10'' are arranged to lie in a plane with the result that all bodies will lie substantially along an equipotential surface in a predetermined attitude of the craft. Any departure of the bodies from an equipotential surface is detected by an electrometer, as previously explained, one electrometer being associated with each pair of bodies. Although the bodies 9', 10', 9'', 10'' have been shown in a plane which is substantially parallel to the plane defined by the longitudinal and transverse axes of the aircraft this arrangement is not essential; for the plane in which the bodies lie may form, if desired, any convenient angle with the plane of the aircraft.

The manner of using my invention will now be described, it being assumed that the pilot takes off over level country 5 and is about to fly into a mountainous region 6, as shown in Fig. 1. After the pilot attains the desired altitude he levels off for horizontal flight and proceeds at a predetermined cruising speed. At this speed the angle of attack is such that both pairs of bodies 9', 10', 9'', 10'' will lie substantially along an equipotential surface with the result that the electrometers associated with the pairs of bodies will show no deflection. Any deviation from this predetermined cruising speed under conditions of horizontal flight will result in a change of the angle of attack with a corresponding tilt in the longitudinal axis of the craft 20 and the common axis through the bodies 9' and 10'. Thus, for every speed which differs from the aforesaid predetermined cruising speed the electrometer associated with the bodies 9' and 10' will give a definite deflection since the bodies under these conditions will no longer lie on an equipotential surface. The electrometer associated within the pair of bodies 9' and 10' having been previously calibrated, horizontality of flight over level country at speeds differing from the predetermined cruising speed is assured by obtaining the deflection of the electrometer corresponding to the speed in question. That each pair of bodies with its associated electrometer will also serve as an inclinometer is believed to be clear. For as the craft proceeds in horizontal flight over the level country 5 at its cruising speed with zero indications of the electrometers, any inclination of either the longitudinal or transverse axis of the craft will be immediately evidenced by corresponding deflections of the electrometers.

As the craft 20 approaches the mountainous region 6 under conditions of horizontal flight, since the equipotential surfaces 2, 3 and 4 are compressed as shown, the bodies 9', 10', for example, will encounter widely different potential areas thus altering the reading of the electrometer which obtained for horizontal flight. The direction of the electrometer deflection will advise the pilot whether to nose the craft up or down. In order to maintain the craft in flight substantially along the selected equipotential surface and thus avoid disaster, it is necessary for the pilot to merely reestablish the readings of the electrometers which obtained under conditions of horizontal flight over the level country 5. If the plane 20 is proceeding at cruising speed it is merely necessary for the pilot to keep both electrometers at zero deflection during the entire flight. This will insure his flying along a selected equipotential surface and thus make impossible any collision of the plane with a mountain under conditions of low visibility.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. The combination with an aircraft of a plurality of insulatingly mounted bodies which in a predetermined attitude of said craft are arranged to lie substantially along an electrical equipotential surface, and means associated with the aforesaid bodies for detecting any departure of the same from substantial coincidence with a single electrical equipotential surface into coincidence with a plurality of such surfaces.

2. The combination with an aircraft of a first pair of bodies and a second pair of bodies, said first and second mentioned pairs of bodies being insulatingly mounted respectively transversely longitudinally of the craft and arranged to lie substantially along an electrical equipotential surface in a predetermined attitude of said craft, and means associated with the aforesaid bodies for detecting any departure of the same from substantial coincidence with a single electrical equipotential surface into coincidence with a plurality of such surfaces.

3. The combination with an aircraft of a plurality of insulatingly mounted bodies which in a predetermined attitude of said craft are arranged to lie substantially along an electrical equipotential surface, and means associated with the aforesaid bodies for determining the magnitude of any departure thereof from substantial coincidence with a single electrical equipotential surface into coincidence with a plurality of such surfaces.

4. The combination with an aircraft of a plurality of insulatingly mounted bodies which in a predetermined attitude of said craft are arranged to lie substantially along an electrical equipotential surface, and means associated with the aforesaid bodies for determining the direction of any departure thereof from substantial coincidence with a single electrical equipotential surface into coincidence with a plurality of such surfaces.

5. The combination with an aircraft of a plurality of insulatingly mounted bodies which in a predetermined attitude of said craft are arranged to lie substantially along an electrical equipotential surface, and means associated with the aforesaid bodies for measuring the difference in electrostatic potential therebetween consequent upon any departure of the bodies from substantial coincidence, with a single electrical equipotential surface into coincidence with a plurality of such surfaces.

6. The combination with an aircraft of a plurality of insulatingly mounted bodies which in a predetermined attitude of said craft are arranged to lie substantially along an electrical equipotential surface, and means associated with the aforesaid bodies for indicating the direction of the potential gradient therebetween consequent upon any departure of the bodies from substantial coincidence with a single electrical equipotential surface into coincidence with a plurality of such surfaces.

7. The method of navigating an aircraft which includes the step of guiding the same substantially along an electrical equipotential surface.

ROSS GUNN.

CERTIFICATE OF CORRECTION.

Patent No. 2,210,932. August 13, 1940.

ROSS GUNN.

It is hereby certified that error appears in the printed specification of the above numbered patent requiring correction as follows: Page 3, second column, lines 44 and 45, claim 7, for the words "guiding the same substantially along an electrical equipotential surface" read --employing an electrical equipotential surface as a guide--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.